United States Patent
Yin et al.

(10) Patent No.: US 8,452,814 B1
(45) Date of Patent: May 28, 2013

(54) GATHERING CONTEXT IN ACTION TO SUPPORT IN-CONTEXT LOCALIZATION

(75) Inventors: Jun Yin, Shanghai (CN); Piotr Powalowski, Zielona Gora (PL); Peter Yung Sen Chen, Los Altos, CA (US)

(73) Assignee: Google Inc., Mountain View, CA (US)

( * ) Notice: Subject to any disclaimer, the term of this patent is extended or adjusted under 35 U.S.C. 154(b) by 12 days.

(21) Appl. No.: 13/279,675

(22) Filed: Oct. 24, 2011

(51) Int. Cl.
*G06F 17/30* (2006.01)

(52) U.S. Cl.
USPC .......................................... 707/793; 707/796

(58) Field of Classification Search
None
See application file for complete search history.

(56) References Cited

U.S. PATENT DOCUMENTS

| | | | |
|---|---|---|---|
| 7,447,624 B2 | 11/2008 | Fuhrmann | |
| 7,461,123 B2 * | 12/2008 | Hauduc et al. | 709/203 |
| 7,774,195 B2 | 8/2010 | Kohlmeier | |
| 8,219,907 B2 * | 7/2012 | Kohlmeier et al. | 715/264 |
| 2002/0002452 A1 * | 1/2002 | Christy et al. | 704/3 |
| 2003/0084401 A1 * | 5/2003 | Abel et al. | 715/501.1 |
| 2004/0088155 A1 * | 5/2004 | Kerr et al. | 704/8 |
| 2006/0069809 A1 * | 3/2006 | Serlet | 709/248 |
| 2007/0022159 A1 * | 1/2007 | Zhu et al. | 709/204 |
| 2007/0220371 A1 * | 9/2007 | Duyanovich et al. | 714/49 |
| 2010/0011354 A1 | 1/2010 | Gharabally | |
| 2010/0325254 A1 | 12/2010 | Sun | |

* cited by examiner

*Primary Examiner* — Anteneh Girma
*Assistant Examiner* — Fatima Mina
(74) *Attorney, Agent, or Firm* — Morris & Kamlay LLP

(57) ABSTRACT

Applications can be localized by localization experts to allow them to be used by a broader customer base. The localization can be done given interface context to produce more applicable results. Context information showing the actions captured as the application is in use can be given to a localization expert by providing the localization expert multiple snapshots of the application in use. The multiple snapshots can convey more information than other forms of context information as they can show use over time. A localization edit based on the multiple snapshots can be used to localize an application.

28 Claims, 4 Drawing Sheets

GATHERING CONTEXT IN ACTION TO SUPPORT IN-CONTEXT LOCALIZATION

BACKGROUND

A localization expert can modify an application for numerous reasons, such as to make the application more useful for a larger audience, to make the application more applicable to a different culture, to account for differences in distinct markets, etc. The application may be modified by modifying a resource such as a text string, color and style settings, image and style icon files, sound files, etc. For example, software originally designed for the United States market may generate an error message containing a text string in English if a user clicks a specific button within the software. A localization expert may localize the error message such that a Chinese-speaking user in the Chinese market may be able to understand the localized error message in a similar way that an English-speaking user in the United States market understands the original message. Accordingly, the same or similar software can be used by a larger number of users.

The localization expert may require context data regarding the application to provide a localization. Without sufficient context data, the localization provided by the expert may not be correct for the application as the meaning of the resource to be localized may be ambiguous. For example, if the localization expert is only given a list of the resources to be translated from one language to another, the translation provided by the expert may not accurately reflect the meaning of the original resources. More specifically, if the application contains multiple resources with the phrase "Enter", a localization expert with only a list of the resources to be localized may not be able to distinguish between the "Enter" which requires pressing the Enter Key and "Enter" which grants a user access to a portion of the application.

The localizations provided by the localization expert, without sufficient context, may not be valid for the application being localized. For example, it may not be valid based on factors such as aesthetic factors, coding factors, space restrictions, changes, etc. Compiling a localized version based on the invalid localizations may cause an undesired localized application to be rendered to a user.

BRIEF SUMMARY

According to an embodiment of the disclosed subject matter, context information of an application to be localized is received, the context information may include a first snapshot captured at a first time and a second snapshot captured at a second time after the first time, where the context information may be captured during a use of the application by a user. At least part of the context information may be rendered to a localization expert, wherein the localization expert may be shown a navigation panel comprising at least one button selected from the group consisting of a rewind element, a play element, a pause element, a fast forward element, a slide bar element and a skip element. A localization edit may be received from the localization expert based upon a difference between the first snapshot and the second snapshot.

According to an embodiment of the disclosed subject matter, context information including a first snapshot and a second snapshot of an application to be localized may be received, the context information being captured during a use of the application by a user. A part of the context information may be rendered to a localization expert and a localization edit based upon a difference between the first snapshot and the second snapshot may be received. The second snapshot may be captured after the first snapshot and the second snapshot may be captured based on a change in a first application state, wherein the first application state is the state of the application when the first snapshot is captured. The second snapshot may be rendered to the localization expert after rendering the first snapshot to the localization expert. At least two snapshots may be rendered to the localization expert. A navigation panel may be rendered to the localization expert and may include at least one interface element selected from the group consisting of a rewind element, a play element, a pause element, a fast forward element, a slide bar element and a skip element. The localization edit may further be based on a third snapshot captured prior to capturing the first and the second snapshot. The localization edit may further be based on a third snapshot captured after capturing the first and the second snapshot.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Based on the state of localization as described above, it has been determined that there is a need for techniques and systems capable of providing relevant context data to a localization expert localizing an application.

Figure 3:
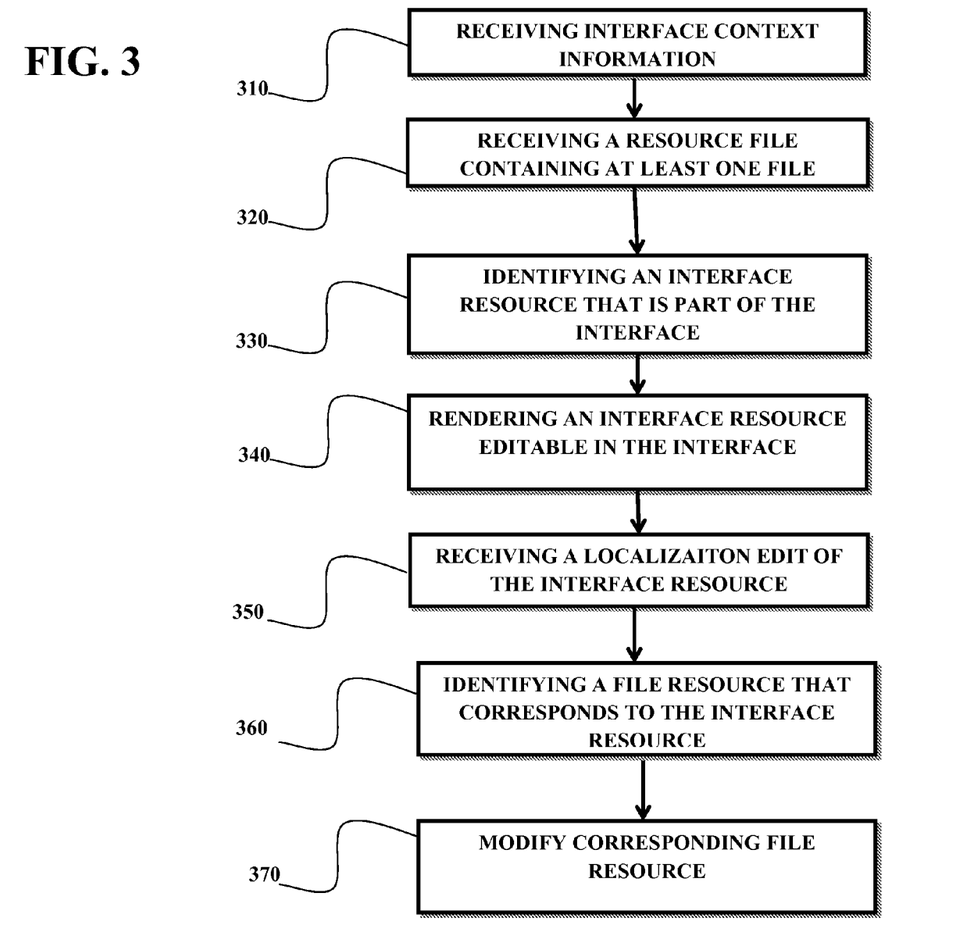
FIG. 3 shows an example process for receiving a localization edit according to an embodiment of the disclosed subject matter.

As shown in FIG. 3, according to embodiments of the disclosed subject matter, context information about an interface of an application can be provided to a localization expert. Context information about an interface can include text data, image data, audio data, video data, color and style settings, HTML, XML, a CSS data, layout information, executable or interpreted code, etc., and any other information relating to the content, layout and behavior of all or part of a user interface. The context information may be received at 310. The context information may be based on one or more of a variety of applications, including, but not limited to, web-based applications, mobile applications, desktop applications, a snapshot of an application, etc., or any other applicable application or a combination thereof. The context information may be used to render a localization interface using, at least in part, HyperText Markup Language (HTML), Extensible Markup Language (XML), and the like, and any other information useful in displaying information. The context information also may contain interface resources that may be editable within the interface at 340. Further, the localization interface may be rendered at 320 based at least in part on a resource file containing file resources that are associated with localizable aspects of the application. The file resources may contain a list of pairs that can be used to identify the resource and the content of the resource at 330. The format of the file resources may vary based on the application, localization expert, developer, etc. The format may be based on, but is not limited to, Java properties files, GWT/UI Binder (Java properties including comments for resources), an XML format, etc., or a combination thereof.

For example, a Java properties resource file that corresponds to messages or errors within the application can contain the following code:

project.message.okay=Press okay to continue
    project.message.user=User %s logged out
    project.error.noData=Found only %d data points!

A GWT/UI Binder formatted resource file that corresponds to the same or similar messages or errors within the application can contain the following code:

# Shown to user in registration form.
    project.message.okay=Press okay to continue
    # Shown to user on log out event. Placeholder %s shows user name.
    project.message.user=User %s logged out An XML format resource file that corresponds to the same or similar messages or errors within the application can contain the following code:

<message>
    <id>project.message.user</id>
    <text>User %s logged out</text>
    <comment>Shown to user on log out event.</comment>
    <placeholders>
      <placeholder>
        <text>%s</text>
        <example>John</example>
      <comment>Placeholder %s shows user name.</comment>
      </placeholder>
    </placeholders>
    </message>

In the examples shown, each of the messages "Press okay to continue," "User %s logged out," and "Found only %d data points" may represent a resource that can be localized. The resources may be obtained from the associated resource files as described herein.

The localization expert may provide a localization edit at 350 by altering an editable portion of the context information that was rendered to the localization expert at 340. The editable portion of the context information can be a localization interface resource. A localization file resource corresponding to the localization interface resource may be identified at 360. A change to context information can be reflected in a change to the corresponding resource in the localization resource file at 370.

Context information that can be used to render a localization interface may be based on a web-based application. The context information can be at least partly generated by activating a browser plugin. The plugin may extract context information from the application and may further extract such information based upon multiple application interface instances (e.g., screen shots) to determine any changes from one or more interface instances to another interface instance. Based on the application interface or changes across interface instances, the plugin may obtain application interface resources. These interface resources may be aspects of the interface that can be made editable by the localization expert in a localization interface. The interface resources may directly correspond to file resources of the application. The interface resources may be obtained by sending a request for a Domain Object Model tree (DOM tree) and Cascading Style Sheet data (CSS) to an application (such as a stand-alone program, an online service, etc.) and detecting interface resources based on the request. For example, regarding Web based applications, the user can install and use a browser plug-in that detects when the page that user is viewing has changed. This can be done by listening to the public notifications and/or detecting the events of all or part of the structure of the page. The events of all or part of the structure of the page can be obtained when the plug-in requests a current DOM tree of the page elements and their CSS styling from the browser. This can contain exactly the interface elements (resources) present (e.g., visible, present but not displayed, etc.) at the moment, including those that may be dynamically created by JavaScript, loaded resources and elements based on retrieved data requests. The plug-in can send all or part of the data to a server for final assembly. The data can include not only HTML and CSS code, but also other resources, such as images and the background used in the page. On the server side, non-interface elements of the DOM tree can be removed and CSS styles can be added as one of the nodes of the DOM tree. The result may be transformed into HTML text or any other suitable form.

Context information based on a mobile application may be generated by extracting embedded text or images from the mobile application. The mobile application may be an application for any mobile technology, including mobile phones (e.g., QWERTY based phones, touchscreen phones, flip based phones, slide based phones, operating systems loaded phones, etc.), tablets (e.g., capable of processing audio-visual data including books, periodicals, movies, music, games, and web content which may be QWERTY based, touch screen based, flip based, etc.) or any other applicable mobile technology. The extraction may be conducted through Optical Character Recognition (OCR) techniques, by reading text in HTML, etc. The implementation may extract location data corresponding to interface resources (e.g., locations at which photographs or videos were taken, stored locations of the mobile platform at the time of a phone call or text message (sent or received), or the like). The location data can be used to allow the localization expert to localize elements of the application by allowing a localization expert to visually see the location of the interface resource.

Some mobile systems allow developers to run their applications on a desktop machine in an emulated mode. These systems grant the emulator program access to the basic structure of presented elements for the purpose of rendering those presented elements. For example, a developer may use the emulator program to visually see a mobile application's home screen on a desktop computer. To capture snapshots of mobile applications, the user can connect the mobile device to a desktop computer and run an application on the mobile device. In accordance with embodiments of the disclosed subject matter, the application can access the interface elements structure and their basic information and retrieve the position (coordinates in mobile screen) for each displayed element and embedded text (if any). It can also retrieve an image and/or snapshot of a widget as an image file, such as a .jpeg or .png file. The retrieved data can be sent to a server and assembled into an HTML structure. The server can create an HTML file for each snapshot taken. For example, each file can have a snapshot of the whole application set as a background, and can contain HTML tags to represent interface elements. As a specific example, for each interface element found in the interface, the application can place a <div> HTML element in an absolute position, according to the coordinates found. The absolute position can be the exact position the interface element is located on the snapshot. Placing a <div> element at the absolute position can avoid incorrectly tagging the interface resource in the event of a resize of the snapshot or the like. For example, the <div> element may be placed based on the coordinates of the message box within the application interface. The coordinates may be based on screen resolution, pixel difference, relative position based on another element, or the like. Based on the <div> element, the system can obtain a snapshot image and textual content from the background and text of the application, respectively. The resulting HTML page can be transformed into an HTML based snapshot. Other techniques for creating and providing the interface elements may be used.

A localization interface based on a snapshot may be generated by extracting context information and application interface resources from an application interface snapshot. For example, the context information and application interface resources may be generated by extracting embedded text or images from within the application interface. The extraction may be conducted through an OCR technique, pattern recognition, file extraction or file copy, or any other applicable extraction technique. Some applications may use "widgets" as interface elements, which can include pre-defined interface features such as buttons, switches, input entries, and the like. For widget detection, sub-parts of a snapshot can be compared with known widget images such as geometric shapes, buttons, switches, windows or other similar widget interface elements. The known widget images can be detected on the snapshots. Based on the detection result, an HTML snapshot can be created. For example, a new HTML page can be created such that the background of the HTML page is based on the application snapshot. For all detected elements (text, widgets, other resources, etc.), absolutely positioned <div> elements can be placed in the page. For example, the HTML background may contain a message box. <Div> elements may be placed around the HTML code corresponding to the text box. The resulting HTML page can be transformed into an HTML based final snapshot. This example is illustrative, and other techniques for generating HTML or snapshots in other formats can be used.

Multiple snapshots of the application may be provided to a localization expert. The multiple snapshots can provide context information "in action," such as to show how the application changes over a period of time, in comparison to a single snapshot which may only provide static context information. Context information in action can be extracted from the multiple snapshots because the multiple snapshots may allow a localization expert to see differences between two or more snapshots. The differences may correspond, for example, to an action that has occurred in the application, and the localization expert may thus use the difference to determine the optimal localization edit. A situation in which no difference exists between two or more snapshots also may provide the localization expert with relevant contextual information.

In some configurations, multiple snapshots may contain visual instructions regarding how to localize the application. The snapshots containing visual instructions may be generated by a developer. The instructions may inform a localization expert about factors that the localization expert should consider when providing localization edits. For example, a localization expert may be provided with multiple snapshots instructing the localization expert that when Box A in an application is clicked, the text behind the box should be translated to Language A. A corresponding visual instruction may indicate that a first snapshot may show Box A being clicked and a second snapshot may contain text stating "Language A" at or near the text location in the snapshot. The text stating "Language A" would be the visual instruction informing the localization expert that upon clicking Box A, a user should see text in Language A. The localization expert can then provide a respective localization edit based on the visual instruction.

Multiple snapshots may be gathered while a user is using the application. For example, captured snapshots can show how a user uses the application in a chronological order over the multiple snapshots. The localization expert can thus see how subsequent users may use a localized application based on the multiple snapshots. The localization expert can provide localization edits based on that information. For example, a first snapshot can show the application containing a "Box 1" which contains the text "Would you like to enter the Flash version of this website". A second snapshot can show a user clicking the "No" button within Box 1. A third snapshot may show that the user is shown an HTML version of the webpage. From the multiple snapshots, the localization expert can determine that by saying "No" to a Flash version of the website, the user is automatically taken to an HTML version. Accordingly, the localization expert may further determine that the users in the locale (e.g., China, India, France, etc.) for which the expert is localizing the application may not automatically know that by selecting "No" to a Flash version they will be directed to an HTML version of the webpage. Therefore, the localization expert may provide a localization such that the text within Box 1 states "Press Yes to enter the Flash version of the website or press No to enter the HTML version of the website". By viewing the multiple snapshots, the localization expert can thus provide more appropriate localization edits.

Figure 4:
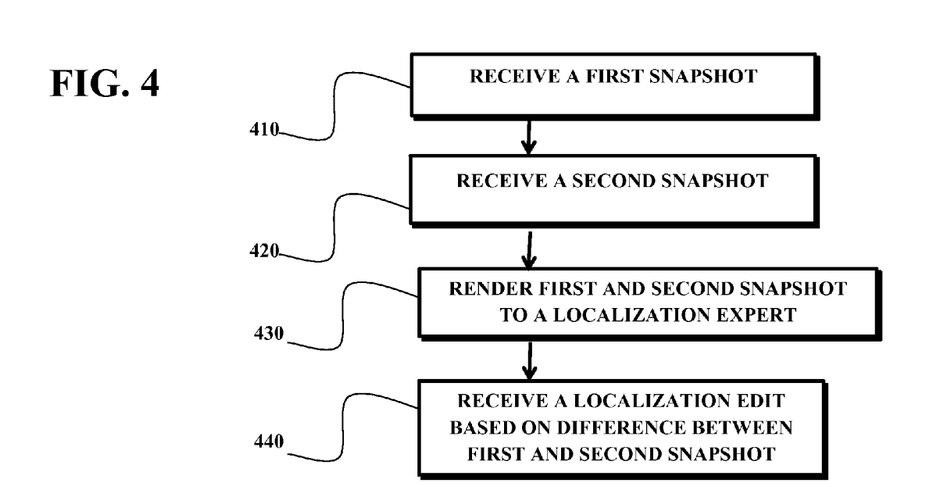
FIG. 4 shows an example process for receiving multiple snapshots for localization according to an embodiment of the disclosed subject matter.

As shown in FIG. 4, multiple snapshots including a first snapshot and a second snapshot may be captured at 410 and 420, respectively, such as by running capture code during a live run of an instance of the application. According to an embodiment of the disclosed subject matter, the capture code may be configured to capture any changes made to the application such that a snapshot of the application is stored when a change in the application occurs. The change in the application may be temporal or may be action triggered. According to an embodiment of the disclosed subject matter, the capture code may use a combination of the temporal and action based triggers to capture multiple snapshots.

According to an embodiment of the disclosed subject matter, the capture code can be configured to store snapshots of the application incrementally, after a predetermined interval of time. For example, the capture code may be configured to capture a snapshot of the application after every 5 seconds. The time interval may vary based on factors such as the amount of movement of a user's mouse, the number of clicks, the size of the application, the portion of the application the user is viewing, or any other appropriate factor or a combination thereof. The time interval may be selected to optimize the capturing of the snapshots such that there is neither an abundance of unnecessary snapshots, nor insufficient context information due to a lack of snapshots.

According to an embodiment of the disclosed subject matter, the capture code may be configured differently for different applications, and may be configured to store a snapshot based on a predetermined event. The predetermined event can include, but is not limited to, a click of the mouse, an input on a keyboard, the amount of time a user has been viewing an aspect of the application, the movement of the users mouse, an audio input by the user, if a new message, alert, window, picture etc. appears, etc., or a combination thereof. The predetermined event may be selected by a developer or may be predetermined automatically based on the type of application.

According to an embodiment of the disclosed subject matter, the application code may contain markers identifying localizable aspects of the application. The markers may be contained within the application code such that they are invisible to a user using the application. For example, the application code may contain the following code:

{Cap} <p> Enter </p>{Cap}
<p> Welcome %s, how are you today?</p>
{Cap} <p> Select your favorite color </p>{Cap}

In this example, the "{Cap}" markers may indicate a portion of the underlying code for an application that may be localizable. The markers within the code may not be displayed, or may otherwise be invisible to a user using the application. The capture code may be configured to store a snapshot when the strings contained within the markers are viewed or modified by a user. According to this example, the capture code may store a snapshot when the "Enter" or the "Select your favorite color" component is viewed or modified by the user, but not when the "Welcome %s, how are you today?" component is viewed or modified by the user.

According to an embodiment of the disclosed subject matter, the capture code may be configured to identify localizable aspects of an application. Accordingly, the capture code may store a snapshot when the identified localizable aspects are viewed or modified within the application. The capture code may identify localizable aspects by parsing out portions of the application code which result in a predetermined change in the application. The predetermined change may include, but is not limited to, directing a user to a different portion of the application, requesting information from a user, receiving information from a user, or the like or a combination thereof.

Referring again to FIG. 4, at 430, the localization expert may view the stored snapshots including the first and second snapshot. The snapshots can be rendered to the localization expert in chronological order such that a snapshot captured earlier in time is rendered prior to rendering a snapshot that was subsequently captured. The number of snapshots made available to the localization expert may vary and may be based on the number of snapshots captured, the complexity of the application, the level of localization required, a predetermined number of snapshots, a dynamically determined number of snapshots, or the like, or a combination thereof. At 440, a localization edit may be received. For example, the localization edit may be based upon a difference between the first and second snapshots as previously described.

Figure 5:
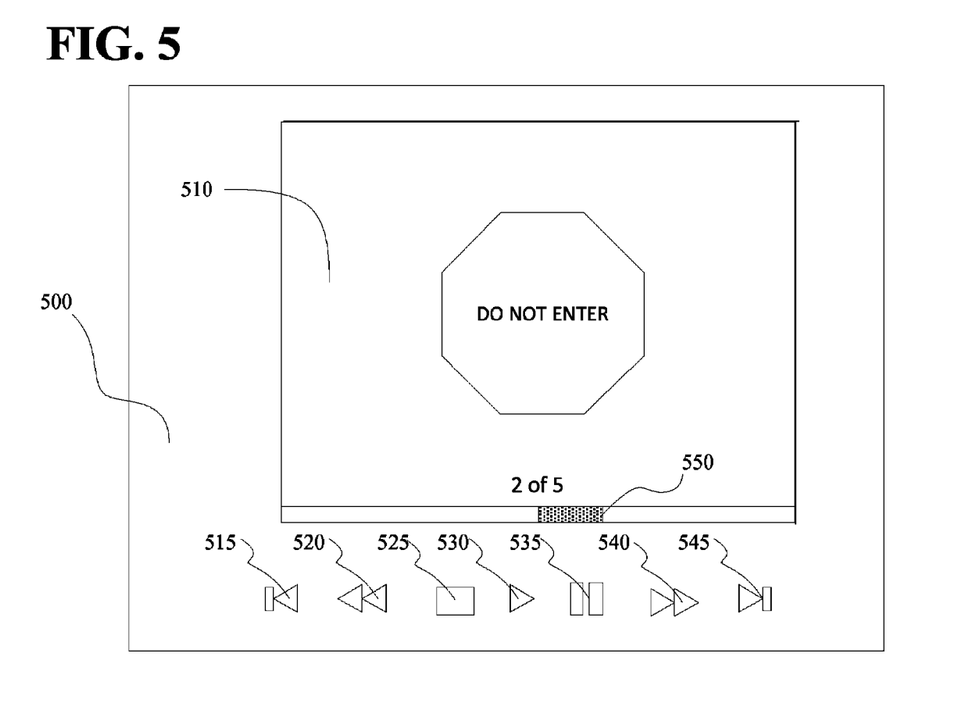
FIG. 5 shows an example interface for accessing application snapshots according to an embodiment of the disclosed subject matter.

FIG. 5 shows an example interface for accessing application snapshots according to an embodiment of the disclosed subject matter. The interface may include a navigation panel 500 which displays the snapshots in a viewing area 510 and can contain at least one of, but is not limited to, skip back 515, rewind 520, stop 525, play 530, pause 535, fast-forward 540, skip forward 545, or slide bar 550 interface elements. The localization expert may view snapshots using the navigation panel in any manner possible by the navigation panel. For example, when the "play" interface 530 is activated, the interface may display a series of application snapshots in the order in which they occurred in the original application. Similarly, the "skip forward" interface element may allow the localization expert to move forward to the next snapshot, or to move forward a set number of snapshots in the series. The operation of these and other example elements shown in FIG. 5, as well as other similar interface elements which may be used, will be readily understood by one of skill in the art. The localization expert may view the snapshots in order or out of order and may view the snapshots a plurality of times. The localization expert may play a slide show of the snapshots by using the navigation panel. According to an embodiment of the disclosed subject matter, the developer may restrict the use of the navigation panel by the localization expert, such that only certain features of the navigation panel are available to the localization expert.

According to an embodiment of the disclosed subject matter, the localization expert may provide a localization edit by altering an interface resource such that the interface resource is an editable portion of the snapshot. A file resource corresponding to the interface resource may be modified. The modified file resource can be used to compile a localized version of the application. According to another embodiment of the disclosed subject matter, the localization expert may edit an interface resource directly. A file resource corresponding to the modified interface resource can be modified, and the modified resource file can be used to compile a localized version of the application.

A similar approach can be used for different types of desktop applications that allow programmatic access to the presented interface and/or where an operating system can provide details of presented interfaces. In those cases, a desktop application in accordance with embodiments of the disclosed subject matter can access data of the captured application directly (when possible) or through an emulator. The interface can be recreated as an HTML page based on the data found. The recreated interface can be sent to the server.

Interface resources can be aspects of the application interface that can be edited by a localization expert using a localization interface. For example, an application message that includes the word "Welcome!" may be shown in a localization interface in a context similar or identical to the way it appears in the corresponding application interface. The localization interface may (perhaps unlike the application interface) render this message in such a way as to make it editable by the localization expert, e.g., by modifying "Welcome!" to "Bienvenue!" to help localize an English-based application interface to a French language user base. In this manner, the localization expert can visually see the context in which the interface resource is embedded in the interface, and localize the interface resource accordingly. The localization expert can thus provide a localization edit of the interface resource directly within the provided localization interface. The localization interface can act as a What You See Is What You Get (WYSIWYG) editing facility to localize application interface resources. By preserving context information of the application interface in the localization interface, the localization expert can better determine the appropriate localization edits to accurately convey the best meaning possible to the user in the localized environment.

According to embodiments of the disclosed subject matter, a resource file associated with an application, which contains file resources, may be received. The resource file containing the file resources can be associated with the application such that the resource file is used when compiling the application and may determine, at least in part, what elements are included in the application interface. The application based on the resource file can contain aspects that may be localizable. File resources within the resource file may be associated with the aspects of the application that may be localizable. In some embodiments, each file resource may correspond to a localizable aspect in the application interface. Accordingly, editing a file resource within the resource file can subsequently alter an application when the application is later compiled using the edited (localized) resource file.

A localization file resource can be a file containing localization interface resources and/or references thereto. The localization file resource can be based upon an application file resource provided by, for example, the developer of the application; information extracted from outputs of one or more instances of the application itself, such as from HTML code generated by the application; or resources extracted from one or more snapshots of the application interfaces. In an example process a localization file resource corresponding to a localization interface resource may be identified. The identification may occur before or after rendering a localization interface to a localization expert. This correspondence can be used to relate a localization interface onscreen edit to a resource in the localization resource file. Thus, a change to the onscreen resource can be reflected in a change to the corresponding resource in the localization resource file.

The localization file resource that corresponds to the resource modified onscreen by the localization expert can be identified by comparing the localization resource being modified to resources in the localization file. A match can be made based upon the similarity between the contents of the onscreen resource and the localization file resource. For example, if an onscreen resource originally contained the text string "Hello", then the text string "Hello" may be matched to the localization file resource containing the same or similar text string. Based on the matching, a corresponding localization file recourse can be identified. Once the corresponding localization file resource is identified, it can be modified in accordance with the change made to the onscreen resource by the localization expert. The modified localization resource file can later be used directly or can be used to generate an application resource file that can be compiled or included by the developer with the rest of the application. The result can be a localized application in which the application resources have been modified by the localization expert.

According to some embodiments of the disclosed subject matter, the implementation may identify a localization file resource corresponding to an interface resource by converting the file resource to a regular expression and comparing the regular expression to the interface resource. For example the file resource may be:

"The user %s has %d messages."
A regular expression of the file resource can be:
"The user [^< >]* has [0-9]+ messages."

According to an embodiment of the disclosed subject matter, file resources corresponding to an interface resource may be identified by individually labeling the file resources to create specially augmented default file resources. Labeling the file resources may distinguish a file resource from other file resources within the resource file. The labels may be inserted both in the beginning and the end of a file resource and can accordingly mark the beginning and end of the resource. For example, a file resource may originally be:

"User %s is done"
An augmented version of the file resource can be:
"{U+1234} User % is done {U+1235}."

A corresponding interface and interface resources may be generated based on the augmented default file resources and rendered to a localization expert. The labels may include non-rendered characters that may be detectable by a machine, but not appear to a localization expert in the localization interface. If the localization expert provides a localization edit through the localization interface, the corresponding resource in the localization file resource can be identified based upon comparing the labels around the onscreen resource being edited and the labels around resources in the localization resource file. The corresponding localization file resource may be modified based on the localization edit, and subsequently a localized application may be compiled based upon the modified localization resource file. The implementation can reduce or eliminate improper localizations caused by mismatches by matching the localization edit within the localization interface with the correspondingly labeled resource element in the localization resource file. As an illustrative example, as shown in Table 1, the term "Enter", which represents asking a user to press the enter key, corresponds to the third file resource within the localization resource file. Without any labeling, the second and third file resources may not be differentiable. However, after labeling the resources, each resource is distinguished by the labels assigned to the beginning and end of the resource. Thereafter, the generated interface resources can contain a matching label as shown in Table 1. The interface resource can therefore be matched to the corresponding augmented default file resource.

TABLE 1

| Resource file location | Context | File Resource | Augmented Default File Resource (DAFR) | Interface Resource based on DAFR |
|---|---|---|---|---|
| 1 | Exit page | Exit | {U+1000} Exit {U+1001} | {U+1000} Exit {U+1001} |
| 2 | Enter page | Enter | {U+2000} Enter {U+2001} | {U+2000} Enter {U+2001} |
| 3 | Press Enter key | Enter | {U+3000} Enter {U+3001} | {U+3000} Enter {U+3001} |
| 4 | Agree to terms | Agree | {U+4000} Agree {U+4001} | {U+4000} Agree {U+4001} |

A localization of the phrase "Enter" in the application that asks the user to press the Enter Key would be matched only with the corresponding localization resource file resource. Accordingly, a localized version of the phrase "Enter" can be matched with the proper augmented default file resource and the use of that file resource to compile the application can result in a properly localized application.

A localization interface built with captured context information can be made editable in accordance with embodiments of the disclosed subject matter. For example, resources in a snapshot HTML code version of an application interface can be marked with HTML tags containing custom attributes with data describing the resource. When the snapshot is loaded in the application, those marking tags in the snapshot are identified and can be assigned events that will display a localization interface that makes the resource editable by the localization expert. For example, consider two example resources:

test.message.1="Logout"
test.message.2="Hello %s!"
An example original snapshot HTML text contains:
 . . . <div>Hello John!<span>Logout</span></div> . . .
The snapshot HTML with markings can be:
 . . . <div>

```
    <span msg="test.message.1">Hello John!</span>
    <span><span
msg="test.message.2">Logout</span></span>
</div> . . .
```

According to an embodiment of the disclosed subject matter, code can be added to aid in localization:

```
// Load the snapshot to an iframe element
iframe.url='http://my.server.com/snapshot?id=1234'
// after loading find all marked elements:
var snapshotHtml=iframe.getHtmlNode( );
var allSpanElements=
snapshotHtml.getElementsByTagName('span');
for (var span:allSpanElements) {
    // look for span elements with a 'msg' attribute
    if (span.hasAttribute('msg')) {
    // add event happening when user clicks on the message
    span.onClick(function(e) {
        var messageId=e.target.getAttribute('msg');
        // retrieve data of the message from backend
        var messageData=
            BackendService.getDataForMessage(messageId);
        // Show the pre-existing UI
        // element with details of the message
        TranslationUIElement.getInstance( )
            .show(messageDetails);
    });
} }
```

Figure 1:
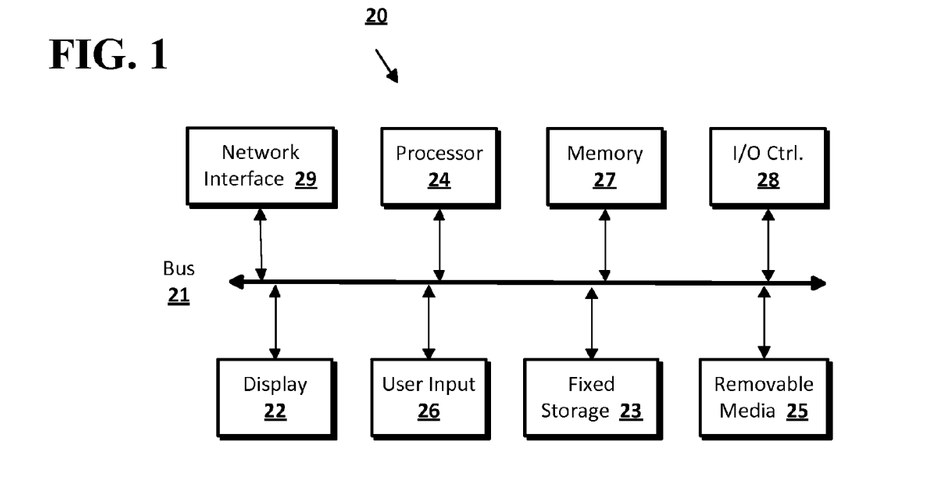
FIG. 1 shows a computer according to an embodiment of the disclosed subject matter.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
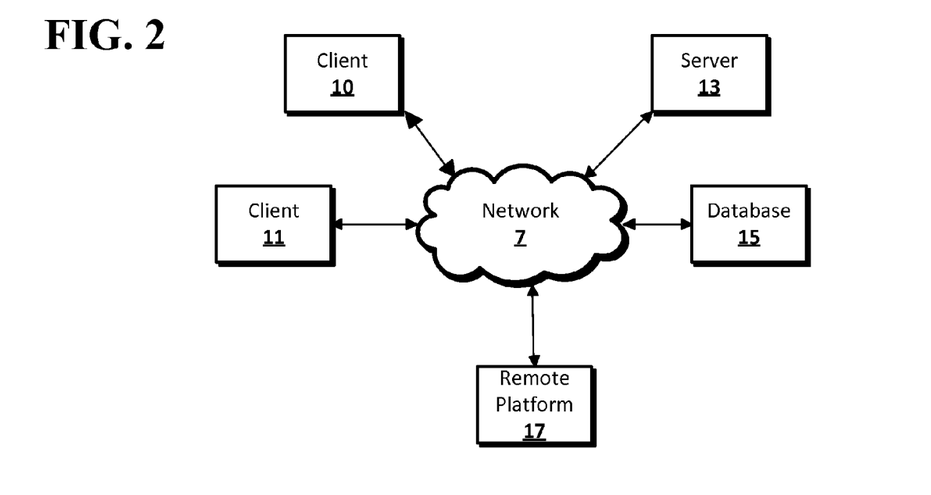
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    receiving context information of an application, the context information including a first snapshot captured at a first time and a second snapshot captured at a second time after the first time, wherein the context information is captured during a use of the application by a user;
    sending information including display elements and at least a part of the context information to a localization expert, wherein the display elements include a navigation panel comprising at least one button selected from the group consisting of a rewind element, a play element, a pause element, a fast forward element, a slide bar element and a skip element;
    receiving a localization edit from the localization expert corresponding to at least part of the application, the localization edit based upon a difference between the first snapshot and the second snapshot; and
    modifying a localization file resource based on the localization edit to reflect the localization edit in the localization file resource;
    identifying an application resource that corresponds to the localization file resource; and
    compiling the application resource based on the modified localization file resource to reflect the localization edit in the application resource.

2. A method comprising: receiving context information of an application to be localized, the context information including a first snapshot and a second snapshot, wherein the context information is captured during a use of the application by a user;
    rendering at least a part of the context information to a localization expert;
    receiving a localization edit corresponding to at least part of the application, the localization edit based upon a difference between the first snapshot and the second snapshot; and
    modifying a localization file resource based on the localization edit to reflect the localization edit in the localization file resource;
    identifying an application resource that corresponds to the localization file resource; and
    compiling the application resource based on the modified localization file resource to reflect the localization edit in the application resource.

3. The method of claim 2, wherein receiving context information of an application to be localized further comprises capturing the second snapshot after capturing the first snapshot.

4. The method of claim 3, further comprising capturing the second snapshot based on a change in a first application state, wherein the first application state is the state of the application when the first snapshot is captured.

5. The method of claim 2, wherein rendering at least a part of the context information to a localization expert further comprises rendering the second snapshot to the localization expert after rendering the first snapshot to the localization expert.

6. The method of claim 2, wherein rendering at least a part of the context information to a localization expert further comprises rendering at least two snapshots to the localization expert.

7. The method of claim 2, wherein rendering at least a part of the context information to a localization expert further comprises rendering a navigation panel to the localization expert.

8. The method of claim 7, wherein the navigation panel includes at least one interface element selected from the group consisting of a rewind element, a play element, a pause element, a fast forward element, a slide bar element and a skip element.

9. The method of claim 2, wherein the localization edit is further based on a third snapshot captured prior to capturing the first snapshot and the second snapshot.

10. The method of claim 2, wherein the localization edit is further based on a third snapshot captured after capturing the first snapshot and the second snapshot.

11. A system comprising:
    a database storing context information of an application to be localized;
        a processor in connection with said database, said processor configured to:
        receive the context information of an application to be localized, the context information including a first snapshot and a second snapshot, wherein the context information is captured during a use of the application by a user;
        render at least a part of the context information to a localization expert;
        receive a localization edit corresponding to at least part of the application, the localization edit based upon a difference between the first snapshot and the second snapshot; and
    modify a localization file resource based on the localization edit to reflect the localization edit in the localization file resource;
    identify an application resource that corresponds to the localization file resource; and
    compile the application resource based on the modified localization file resource to reflect the localization edit in the application resource.

12. The system of claim 11, further configured to capture the second snapshot after capturing the first snapshot.

13. The system of claim 12, further configured to capture the second snapshot based on a change in a first application state, wherein the first application state is the state of the application when the first snapshot is captured.

14. The system of claim 11, further configured to render the second snapshot to the localization expert after rendering the first snapshot to the localization expert.

15. The system of claim 11, further configured to render at least two snapshots to the localization expert.

16. The system of claim 11, further configured to render a navigation panel to the localization expert.

17. The system of claim 16, wherein the navigation panel includes at least one interface element selected from the group consisting of a rewind element, a play element, a pause element, a fast forward element, a slide bar element and a skip element.

18. The system of claim 11, wherein the localization edit is further based on a third snapshot captured prior to capturing the first snapshot and the second snapshot.

19. The system of claim 11, wherein the localization edit is further based on a third snapshot captured after capturing the first snapshot and the second snapshot.

20. A non-transitory computer readable storage medium storing program instructions, which when executed by a processor, cause the processor to:
   receive the context information of an application to be localized, the context information including a first snapshot and a second snapshot, wherein the context information is captured during a use of the application by a user;
   render at least a part of the context information to a localization expert; and
   receive a localization edit corresponding to at least part of the application, the localization edit based upon a difference between the first snapshot and the second snapshot;
   modify a localization file resource based on the localization edit to reflect the localization edit in the localization file resource;
   identify an application resource that corresponds to the localization file resource; and
   compile the application resource based on the modified localization file resource to reflect the localization edit in the application resource.

21. The non-transitory computer readable storage medium of claim 20 further configured to capture the second snapshot after capturing the first snapshot.

22. The non-transitory computer readable storage medium of claim 20 further configured to capture the second snapshot based on a change in a first application state, wherein the first application state is the state of the application when the first snapshot is captured.

23. The non-transitory computer readable storage medium of claim 20 further configured to render the second snapshot to the localization expert after rendering the first snapshot to the localization expert.

24. The non-transitory computer readable storage medium of claim 20 further configured to render at least two snapshots to the localization expert.

25. The non-transitory computer readable storage medium of claim 20 further configured to render a navigation panel to the localization expert.

26. The non-transitory computer readable storage medium of claim 25 wherein the navigation panel includes at least one interface element selected from the group consisting of a rewind element, a play element, a pause element, a fast forward element, a slide bar element and a skip element.

27. The non-transitory computer readable storage medium of claim 25 wherein the localization edit is further based on a third snapshot captured prior to capturing the first snapshot and the second snapshot.

28. The non-transitory computer readable storage medium of claim 25 wherein the localization edit is further based on a third snapshot captured after capturing the first snapshot and the second snapshot.

* * * * *